UNITED STATES PATENT OFFICE.

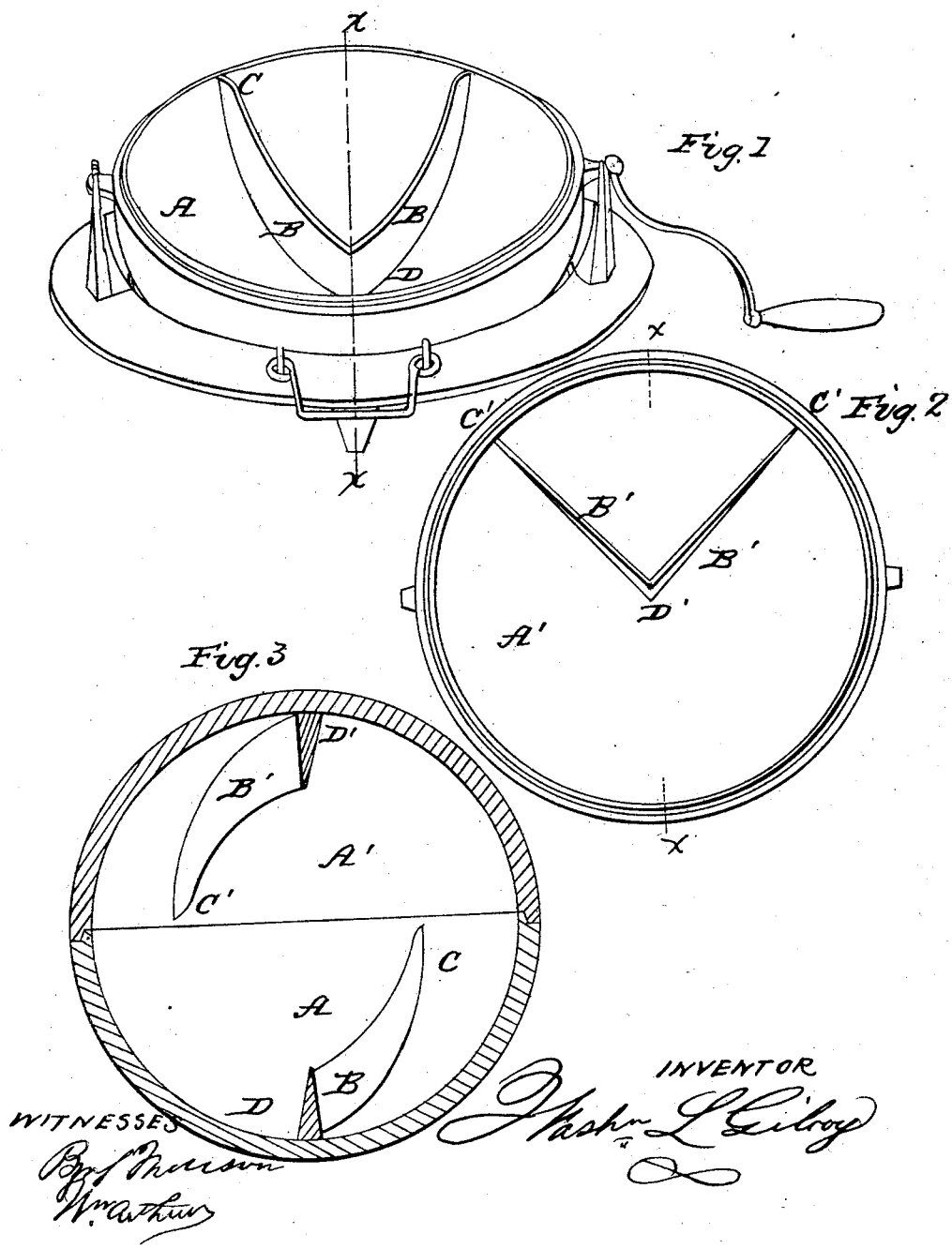

WASHINGTON L. GILROY, OF PHILADELPHIA, PENNSYLVANIA.

COFFEE-ROASTER.

Specification of Letters Patent No. 23,563, dated April 12, 1859.

*To all whom it may concern:*

Be it known that I, WASHINGTON L. GILROY, of the city of Philadelphia, in the State of Pennsylvania, have invented a new and useful Improvement in Hollow Spherical Coffee-Roasters; and I do hereby declare that the following is a full, clear, and exact description of the construction and operation of the same, reference being had to the accompanying drawings, making a part of this specification, in which—

Figure 1, represents the half to which the crank-handle is fixed, of the said spherical, coffee roaster, supported by its journals upon the usual "rim;" and Fig. 2, the opposite half of the same, both showing my improvement applied; and Fig. 3, represents a transverse section of Figs. 1 and 2, through the line $x$, $x$, thereon, like letters in the several figures indicating the same parts.

The hollow, spherical, cast iron coffee-roaster in common use (patented to Thomas R. Wood, September 17th, 1849), being well known, a particular description of the same is not necessary herein, further than to say that it is a hollow sphere, made to rotate upon journals, and parted in halves in the line of its axis, the inside, when the two parts are united, producing a uniform, even surface, and consequently when the apparatus is used for the purpose intended, the mass of coffee, or especially that portion of it which is in contact with the inner surface of the lower half of the said roaster or sphere, necessarily has a sliding motion upon the said surface, as the sphere is rotated, and consequently the grains constituting this part of the mass become too much roasted, and even charred, before the grains constituting the other parts of the same are sufficiently roasted, unless the very inconvenient mode of agitation, consisting in lifting the containing sphere off the fire and shaking it violently, be frequently resorted to during the process of roasting or browing the coffee.

To obviate this difficulty, and render the apparatus perfect in operation when simply a regular, moderate, rotary motion upon its journals is given to the containing sphere, is the object of my invention.

It consists in casting, or otherwise fixing obliquely across on the inside surface of each of the two halves of the said hollow sphere, two staying-and-guiding pieces, reaching, each from different parts of the edge of the said half sphere, and uniting together (like a V) in its center, so as to produce an angular stay of a sufficient height, and with its apex pointing in the direction of the intended rotary motion, whereby, when the said sphere is rotated the usual objectionable sliding motion of the coffee is prevented, and the grains at the upper surface, or farthest from the fire are continually being re-transferred to the bottom or nearest to the fire.

To enable others to make and use my invention, I will proceed to describe it more minutely.

In the drawings, A, represents what may be called the bottom half of the hollow sphere, and A', the top half.

B, B, represents the two obliquely fixed staying-and-guiding pieces of the bottom half (A), and B', B', the two, like obliquely fixed, staying-and-guiding pieces, in the top half (A') of the same. In each of these halves of the sphere, the said staying-and-guiding pieces reach from the edge at C and C, or C' and C', directly to the center of the same, at D or D', where they unite, (at about a right angle), forming an apex pointing in the direction of the intended rotary motion of the sphere. These obliquely joined stays-and-guides (B, B, and B' B') may be readily cast on, in making the two halves (A, and A'), and should be about an eighth of an inch thick, and from three-fourths to an inch high at the centers (D and D') of the half spheres, and gradually tapered down to about half this height, at its edge C and C' for a roasting sphere of six or seven inches in diameter.

Operation: The unroasted coffee having been placed, as usual, in the bottom half (A), and the upper half (A') secured in juxtaposition thereon, a steady, moderate and regular rotary motion is given to the containing sphere; when, in consequence of the peculiar construction and arrangement of the devices, B, B, and B' B', that portion of the mass of the coffee grains which usually lies in direct contact with and upon the inner surface of the roasting sphere, is effectually prevented from sliding on the same; while the surface portions distant from the center of the said mass of coffee are continually approaching and falling over the upper edges of the stays-and-guides into the middle of the lower side of the sphere, and from which the said stays-and-guides allow it to again approach the ends and become again the surface portions, and the whole of that which was kept back by the said stays-and-guides, has passed them; and so on, as the sphere is rotated, the coffee next to the coolest parts is continually being thrown into the hottest part (which of course is the center of the part in contact with the fire), and that on the hottest part is being continuously removed from the same toward the cooler parts or ends; and thus a perfect uniformity in the degree of roasting is effected throughout the whole mass of the grains, without any difficulty or uncertainty whatever.

I am aware that "reversibly inclined concentrating plates" have been applied to the "inner circumference of a revolving, coffee-roasting cylinder," for the purpose of preventing the coffee from "accumulating in piles at the heads of such cylinder" during the operation of roasting; as in Herman's patent of September 7th 1858; but as this result cannot take place in a spherical roaster during a rotary motion upon its axis, because, from its shape, the contained coffee must necessarily gravitate to, and slide along the middle of its bottom, or the part nearest to the fire, an arrangement therein of "concentrating plates," would be worse than useless; therefore, I do not claim, broadly, the use of plates or guides in coffee roasters; but,

What I claim as new and desire to secure by Letters Patent is,

The arrangement of the two sets of the united, staying and guiding pieces (B, B and B', B',) on the inner side of the said hollow sphere, each set being placed diametrically opposite to the other, and with their apexes in the direction of the rotary motion of the said sphere, that they may, in succession, operate in combination with the interior spherical curve of the latter, during its rotary motion, to remove the coffee from the middle of the bottom of the said sphere, toward the ends thereof and, eventually, permit it to fall gradually over the edges of the said staying and guiding pieces, into the middle of the bottom again, as specified; thus rendering the said spherical, coffee-roaster perfect in its operation, as described.

WASH. L. GILROY.

Witnesses:
BENJ. MORRISON,
JOHN THOMPSON.